(No Model.)

F. F. BISCHOFF.
EGG CASE.

No. 489,118. Patented Jan. 3, 1893.

Witnesses
Geo. W. Young
Anna V. Faust

Inventor
Ferdinand F. Bischoff
Benedict F. Morsell
By C. W. Vormeyer

UNITED STATES PATENT OFFICE.

FERDINAND F. BISCHOFF, OF THIENSVILLE, WISCONSIN.

EGG-CASE.

SPECIFICATION forming part of Letters Patent No. 489,118, dated January 3, 1893.

Application filed August 4, 1892. Serial No. 442,134. (No model.)

*To all whom it may concern:*

Be it known that I, FERDINAND F. BISCHOFF, of Thiensville, in the county of Ozaukee and State of Wisconsin, have invented a new and useful Improvement in Egg-Cases, of which the following is a description, reference being had to the accompanying drawings, which are a part of this specification.

My invention has relation to improvements in cases adapted particularly for the storing of eggs by a merchant, and their ready removal in case of sale, and it consists in the improved construction and combination of parts hereinafter more fully set forth.

Figure 1:
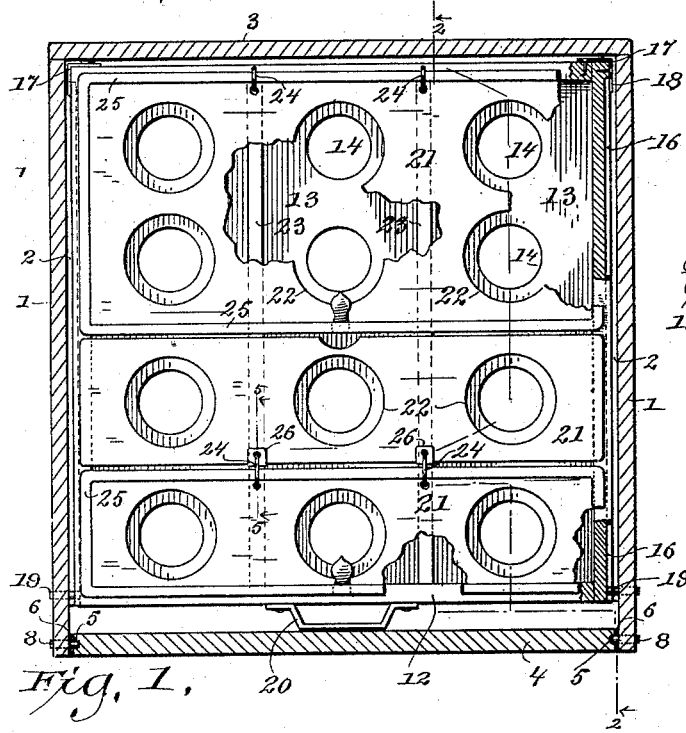
Figure 4:
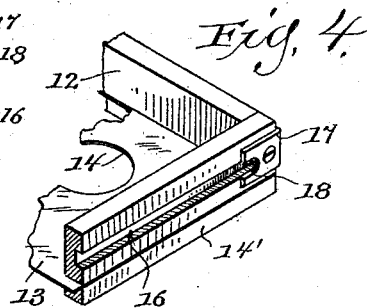
Figure 5:
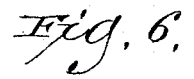
Figure 6:
Figure 2:
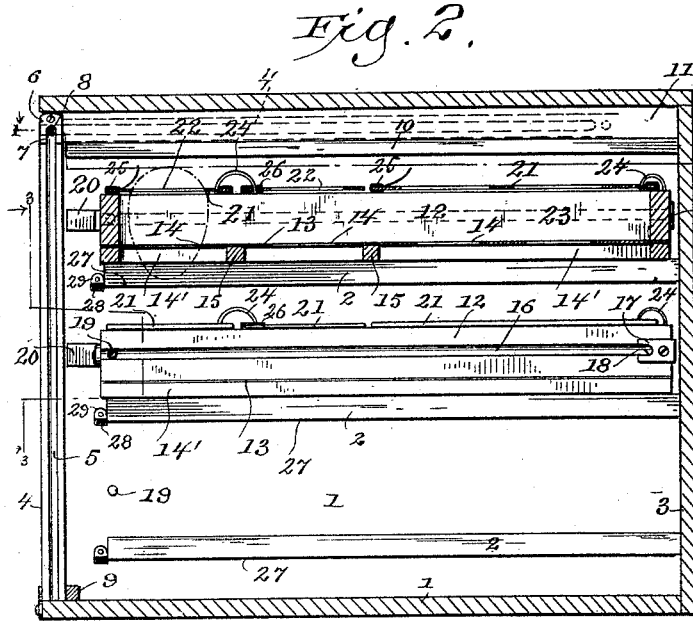
Figure 3:
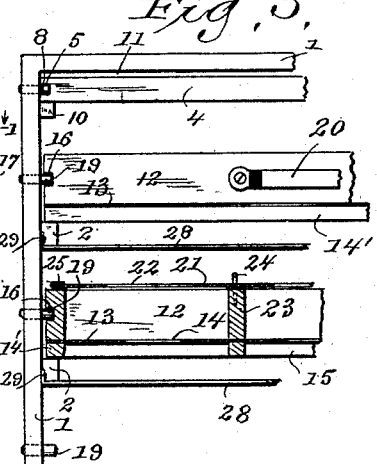

In the accompanying drawings, Figure 1, is a horizontal section on the line 1—1 of Fig. 2, parts of the upper apertured covers being broken away to disclose the apertured bottom of the tray, and certain parts of the side of the tray being shown in section. Fig. 2, is a vertical section on a plane indicated by the line 2—2 of Fig. 1. Fig. 3, is a front view of a fragment of the case, the door being shown as slid inward upon its supporting cleats, and one of the trays being shown in section as indicated by the dotted line 3—3 of Fig. 2. Fig. 4, is a perspective view of a fragment of one of the trays with the cover removed, showing clearly the groove in the side of the tray and the recessed angle plate at the terminus of the groove. Fig. 5, is a sectional view on the line 5—5 of Fig. 1, and Fig. 6, is a view of a fragment of the partition for keeping the eggs in the tray beneath it down to their places.

Like numerals of reference designate like parts throughout the several views.

Referring to the drawings, the numeral 1 indicates the outer casing, preferably of rectangular form, and having each of its opposite sides provided with parallel cleats 2 arranged equi-distant apart, and adapted to support the egg trays hereinafter referred to. The case is provided with a rigid back piece 3 and a hinged front piece or door 4. This door is provided upon opposite edges with longitudinal grooves 5, the upper end of the edges having secured thereto angle irons 6, one member of each of said irons provided with a recess 7 registering with the longitudinal groove 5. Into these recesses pins 8, 8, normally fit, said pins extending laterally inward from the sides of the casing. When the door is closed as shown in Fig. 2 of the drawings it sets back into the case far enough to register with the extreme ends of the top and bottom of said case, and its lower end bears against a transverse strip 9.

Cleats 10, 10, are secured to the inner sides of the casing, slightly below the top thereof leaving sufficient space, as indicated at 11, for the accommodation of the door when the same is slid inward horizontally, as hereinafter explained. When it is desired to open the door, it is swung out from the lower end, working at its upper end upon the pins 8, 8, as pivots. It is adapted to be swung upwardly until it reaches an approximately horizontal position, when it may be slid inward upon the cleats 10, 10, so as to be confined entirely within the casing, partly filling up the space 11 above the cleats 10 and resting upon the cleats 10 as supports, as indicated by dotted lines in Fig. 2.

The numeral 12 indicates the trays which are contained within the casing. These trays are preferably of rectangular form and each consists of side and end pieces. The bottom of the tray is preferably composed of pasteboard 13 having a series of apertures 14 therein. This bottom piece is preferably interposed between the lower edges of the sides and ends of the tray and the upper edges of a supplemental frame 14' secured to the tray by rivets or other equivalent means. It is obvious, however, that the supplemental frame may be dispensed with and the pasteboard bottom secured in any other desirable manner, although by preference I desire to employ this supplemental frame in connection with transverse strips 15 bearing against the pasteboard bottom for the purpose of reinforcing and strengthening the same. They furthermore provide contacting surfaces for the tray when the same is slid in and out of the casing. The sides of the tray are provided with longitudinal grooves 16, while the rear ends of said sides have secured thereto angle irons 17, corresponding to the angle irons employed at the upper ends of the edges of the door and provided with recesses 18 registering with the grooves 16.

The sides of the casing are provided with a series of pins 19 arranged in vertical alignment above and approximately in line with the forward ends of cleats 2 and adapted to enter the grooves in the sides of the tray, the lower edges, or more properly, the supplemental frame and the transverse strips 15, resting upon the cleats 2 secured to the inner sides of the case. The front end of each tray is provided with a handle 20, which forms a convenient means for pulling the tray outwardly from within the case, which can be readily done when the door 4 is in the position shown by dotted lines in Fig. 2. It will be noticed that cleats 2 do not extend the full length of the case so that when a tray is pulled outwardly a certain distance it would be no longer supported upon said cleats, but the entire weight will bear upon pins 19 which enter the side grooves 16. When, however, a tray has been pulled out a certain distance the pins 19 will bear against the ends of the recesses 18 in the angle irons 17 and thereby prevent the entire withdrawal of the tray which may now be allowed to swing downwardly upon the pins 19, 19 as pivots, and thus hold the tray at a convenient incline for ready access to its contents. The angle irons not only prevent the entire withdrawal of the trays, but also serve to reinforce and strengthen the grooves at the point where the trays swing upon the pivot pins.

The top of each tray is formed of a series of pasteboard strips 21 provided with apertures 22 of greater diameter than the bottom apertures. Interposed between the bottom 13 and the sectional cover, and secured to the bottom are longitudinal strips 23, two being shown in the present illustration of my invention. These not only serve to strengthen and re-enforce the bottom piece but also serve as a convenient means for securing the hinge connections of the several sections of the cover. In the figures of the drawings I have shown the cover as consisting of three sections, but I do not wish to be understood as limiting myself to any particular number of sections so long as I employ a plurality thereof. The hinges are formed by means of staples 24 which in the front and intermediate hinge connections enter entirely the longitudinal strips 23 whereas in the rear hinge joint one leg of the staples enters the longitudinal strip and the other the rear end of the tray. It will therefore be apparent that the outer section of the cover opens inwardly, the intermediate section outwardly and the rear section inwardly. These several sections, for the purpose of stiffening and strenghening, may be bordered with a metallic lining or fold 25, which also serves to prevent the apertures of the pasteboard through which the staples pass from enlarging, as the wear of said staples is directly against the metal. If preferred, however, instead of bordering the edges of the several sections of cover, the same may be provided with small rectangular metal plates 26, shown in Fig. 1 of the drawings and also in detail in Fig. 5, to receive therethrough the ends of the staples.

The cleats 2, have arranged beneath the same partitions 27, composed of oil cloth or other analogous material, said partitions being stiffened at their edges by metal strips 28, embracing the edges, said strips also having their ends bent angularly as indicated at 29 to form a convenient securing flange. These partitions are arranged at such a height above the tray immediately below the same so as to nearly touch the butts of the eggs contained in said lower tray so that the eggs are pre-prevented from contacting in case of shipment.

Fig. 2, of the drawings shows one of the eggs in position within the top tray. From this it will be seen that the point of the egg rest in the smaller apertures 14 of the bottom while the butt of the egg passes through the larger opening 22 of the cover.

From the foregoing description it is thought that the construction of my improved device will be readily understood. The great point of advantage which I claim for the same is the facility with which access may be obtained to the eggs by the dealer. The door 4, of course normally remains in the position shown in full lines Fig. 2. When a sale is to be made all that is necessary is simply to shift the door to the position illustrated by dotted lines in Fig. 2, as previously fully explained. The tray containing the eggs is now pulled out, and if only a small number is desired by the customer, it need only be pulled out far enough to permit the outer section of the cover of the frame to be uplifted. If a larger quantity of eggs is desired the tray is pulled out still farther so as to permit the intermediate section of the cover to be uplifted. While if the full number of eggs contained within a tray is desired, or a fraction thereof greater than the number contained beneath the outer and intermediate covers, the tray is pulled out its entire distance and allowed to swing down to an incline upon the pins 19, 19, as a pivot. In case the cover to one of the trays was not made in sections, the result would be that the tray, in all cases, whether a small number or a large number of eggs were desired, would have to be pulled out its entire distance. Furthermore, in a cover of the construction just referred to, after the cover has been uplifted and a certain number of eggs removed, it invariably results that a number of the remaining eggs become disarranged, necessitating rearrangement of the same so that when the cover is subsequently closed the butts of the eggs will accurately register with the apertures of the cover. By providing a cover of the character described and shown in my application for patent, however, this difficulty is obviated, or, at least, to a great extent removed, as the uplifting of the small sections composing the cover are not as apt to displace the eggs, or at the most but a small number thereof.

My device still further possesses advantages in the arrangement of the trays within the outer casing and also a novel arrangement of the door, whereby, when the same is open, it may be held within the case entirely out of the way, without any trouble whatever to the dealer.

Having thus described my invention what I claim and desire to secure by Letters Patent of the United States is:

1. In an egg case, the combination, with an outer casing, of trays arranged to slide in and out thereof, the tops of said trays consisting of a series of hinged sections, whereby access may be gained to the eggs, upon the partial drawing out of a tray, by the uplifting of a section of the cover, said sections joined in pairs by a common hinge joint, substantially as set forth.

2. In an egg case, the combination, of an outer casing, a series of trays sliding therein, said trays provided with an apertured bottom piece, longitudinal strips secured to the upper side of the bottom piece, staples secured to said longitudinal strips, and a cover consisting of a series of sections through which the legs of the staples pass to form hinge joints therefor, substantially as set forth.

3. In an egg case, the combination, of an outer casing, trays sliding therein, said trays provided with apertured bottom pieces, longitudinal strips secured to the upper side of the bottom pieces, a cover consisting of a series of sections, metallic surfaces upon said sections, and staples having their legs engaging said metallic surfaces and entering the longitudinal strips, substantially as set forth.

4. In an egg case, the combination of an outer casing, cleats secured to the inner sides thereof, and terminating short of the front of the casing, pins extending inwardly from the sides of the casing above and approximately in line with the ends of the cleats, and trays resting upon the cleats and provided with side grooves to receive the pins, said trays, when drawn out beyond the ends of the cleats, adapted to be swung downwardly upon the pins as pivots, substantially as set forth.

5. In an egg case, the combination, of an outer casing, cleats secured to the inner sides thereof and terminating short of the front of the casing, pins extending inwardly from the sides of said casing, above and approximately in line with the ends of the cleats, trays resting upon the cleats and provided with side grooves to receive the pins, said trays when drawn out beyond the ends of the cleats, adapted to be swung downwardly upon the pins as pivots, and angle irons secured to the rear angles of the trays, and provided with recesses registering with the ends of the side grooves, whereby said grooves are re-enforced and strengthened at the point where the trays are swung down upon the pivot pins, substantially as set forth.

6. In an egg case, the combination, of an outer casing provided upon its inner sides with cleats, a tray, a supplemental frame secured to the under edges of the sides and ends of the tray and confining the bottom of said tray, and intermediate strengthening strips secured to the underside of the bottom, the ends of said strengthening strips and the supplemental frame adapted to rest upon the supporting cleats of the casing, substantially as set forth.

7. The combination of a casing provided with an open front, cleats secured to the sides of said casing slightly below the top thereof, lateral pins extending inwardly from the sides of the casing near their front edges, and a door provided with edge grooves adapted to receive the pins, to turn thereon as pivots, and to be slid within the casing and to rest on the side cleats thereof, substantially as set forth.

8. In an egg case, the combination of a casing, a series of trays therein provided with apertured top and bottom pieces through which the contained eggs project, a flexible partition interposed between the trays, and a metallic border for said partition, provided with end angular securing flanges, substantially as set forth.

In testimony whereof I affix my signature in presence of two witnesses.

FERDINAND F. BISCHOFF.

Witnesses:
ARTHUR L. MORSELL,
ANNA V. FAUST.